United States Patent [19]

Bednorz et al.

[11] Patent Number: 4,600,854
[45] Date of Patent: Jul. 15, 1986

[54] PIEZOELECTRIC STEPPING ROTATOR

[75] Inventors: Johannes G. Bednorz; Martin A. Lanz; Hermann Nievergelt; Wolfgang D. Pohl, all of Adliswil, Switzerland

[73] Assignee: International Business Machines Corp., Armonk, N.Y.

[21] Appl. No.: 655,271

[22] Filed: Sep. 28, 1984

[30] Foreign Application Priority Data

Mar. 5, 1984 [CH] Switzerland ............... 104926/84

[51] Int. Cl.$^4$ ............................................. H01L 41/08
[52] U.S. Cl. .................................... 310/331; 310/328
[58] Field of Search .................. 310/328, 317, 330-332

[56] References Cited

U.S. PATENT DOCUMENTS

| 3,377,489 | 4/1968 | Brisbane .............................. 310/328 |
| 3,684,904 | 8/1972 | Galutva et al. ...................... 310/328 |
| 3,952,215 | 4/1976 | Sakitani .............................. 310/8.1 |
| 4,163,168 | 7/1979 | Ishikawa et al. .................... 310/328 |
| 4,422,002 | 12/1983 | Binnig et al. ....................... 310/328 |
| 4,435,667 | 3/1984 | Kolm et al. ......................... 310/367 |
| 4,468,583 | 8/1984 | Mori .................................... 310/328 |

FOREIGN PATENT DOCUMENTS 0604057  4/1978  U.S.S.R. .............................. 310/328

OTHER PUBLICATIONS

Hauke, vol. 16, No. 6, Nov. 1973, IBM Technical Disclosure Bulletin.
Binnig, et al, vol. 22, No. 7, Dec. 1979, IBM Technical Disclosure Bulletin.
Binnig, et al, vol. 23, No. 7B, Dec. 1980, IBM Technical Disclosure Bulletin.
Japanese Journal of Applied Physics, vol. 22, No. 12, Dec. 1983, pp. 1925-1927-entitled "Micro-Angle Adjusting Device Using PMN Electrostrictors," by M. Aizawa, K. Uchino & S. Nomura.
Piez Drive with Coarse and Fine Adjustment, by G. Binnig et al, IBM Technical Disclosure Bulletin, vol. 22, No. 7, Dec. 1979, pp. 2897-2898.

*Primary Examiner*—Mark O. Budd
*Attorney, Agent, or Firm*—John D. Crane; Anne V. Dougherty

[57] ABSTRACT

The rotator comprises a piezoelectric bender (4) pivotally supported (2, 3) at one end and carrying a means for being clamped (6) to which a "payload" (7) may be attached. The bender (4) has split electrodes to keep its ends parallel when energized. Normally engaging the means for being clamped (6) are clamping members (15, 17) attached to a pair of piezoelectric benders (10, 11) which are fixed in supports (12, 13) resting on a base plate (1).

With the pair of benders (10, 11) energized, the means for being clamped (6) is released and energization of the central bender (4) results in the lifting of the payload (7) by one step. The means for being clamped (6) is then re-arrested and its pivot (2, 3) released by means of actuating the ends of bimorphs (10, 11) associated with clamping members 14 and 16 and the central bender (4) is permitted to stretch. The rotator is then prepared for the next step of rotation about the pivot (2). This embodiment permits rotation through about 15 degrees. Two further embodiments conceived for unlimited rotation are described.

5 Claims, 12 Drawing Figures

PIEZOELECTRIC STEPPING ROTATOR

The present invention relates to piezoelectric stepping rotators permitting circular displacements with seconds of arc precision, for use in surface science and micro-manufacturing applications.

BACKGROUND OF THE INVENTION

Recent advances in surface science, such as the invention of the Scanning Tunneling Microscope with which surface features down to the atomic level can be resolved, and in manufacturing where surface structures below 1 $\mu$m are within reach of device manufacturers, have created a great desire for positioning devices which permit the displacement of objects or tools, like electrodes, over millimeters or even centimeters, but with a reproducible accuracy in the range of nanometers. In addition to positioners which permit linear displacements, there exists a strong requirement for rotary positioners.

In view of the fact that essentially all investigations of surface features and manufacturing steps that involve structures of the size indicated above require the absolute avoidance of contamination by dust and humidity, the positioners used in these applications must be vacuum-compatible and be able to resist baking up to about 500 K. Also, to be able to resolve features down to the atomic level, the positioners used must be free of vibrations to a very high degree, i.e. they have to be mechanically decoupled from the outside world. These requirements can be met by positioners working with piezoelectric elements which are controlled by electrical potentials applied to their electrodes.

Known in the art are piezoelectric positioners which permit longitudinal translation of an object, such as the one shown by Binnig and Gerber in IBM Technical Disclosure Bulletin, Vol. 22, No. 7, p. 2897 where a H-shaped piezoelectric member can move in a trough-like channel by alternatively clamping pairs of legs against the channel walls and contracting and expanding its center portion. Of course, the Binnig, et al straight channel permits only linear motion.

Also known in the art is another class of piezolectric positioners which avoid the channel in favor of greater flexibility of movement. They use a tablelike configuration, as shown by Binnig and Gerber in IBM Technical Disclosure Bulletin, Vol. 23, No. 7B, p. 3369, where the table rests on eight piezoelectric legs, four of which are connected to an inner section of the table, the others to its outer section, the sections being linked by piezolectric elements. By controlled lifting and lowering the said groups of legs and through appropriate extension and contraction of the linking elements, the table can be moved in orthogonal directions.

Another table configuration is known from U.S. Pat. No. 4,422,002, issued to Binnig, et al, where the piezolectric table has three legs whose bottom surfaces are equipped with electrostatic clamping means which permit selective clamping of the legs to a bench. Appropriate control of the actuating voltages at the table and the legs causes the device to move linearly or pivotally about its legs.

Obviously, only the last-mentioned positioner permits some rotary motion, but because of the threeleg configuration its rotation is not strictly circular so that the re-finding of a once held position is extremely difficult.

Still another type of stepping motor is disclosed in IBM Technical Disclosure Bulletin, Vol. 16, No. 6, p. 1899. Here the periphery of a capstan is engaged radially by a piezoelectrically driven rod which in turn is movable tangentially be a piezoelectric transducer. This motor permits the capstan to perform small rotary steps, suitable for a tape drive as shown, but in no way accurate or reproducible in the sense of scientific or manufacturing applications.

SUMMARY OF THE INVENTION

It is, therefore, one of the objectives of the present invention to provide a piezoelectric positioner capable of accurate, reproducible positioning.

It is another objective of the invention to provide a piezoelectric positioner capable of providing continuous, position-independent displacements along a circular path.

A further objective of the invention is to provide a piezoelectric positioner capable of functioning in an ultra-high vacuum, high temperature, vibration free environment.

It is a final objective of the invention to provide a piezoelectric positioner having accuracy in the order of nanometers.

These and other objectives are achieved by a piezoelectric rotator comprising at least one piezoelectric rod with one end pivotally supported and at its other end carrying means for being clamped, at least one pair of second piezoelectric benders each connected to at least one clamping member arranged for engagement of said means for being clamped, and circuit means to permit actuation of said first piezoelectric bender to cause it to assume a bent shape, and to actuate said pair(s) of second piezoelectric bender at the time said first bender has assumed its bent shape so as to clamp the latter in that position.

BRIEF DESCRIPTION OF THE DRAWINGS

Details of the invention will hereafter be described, by way of example, with reference to the accompanying drawings showing several embodiments of the invention as follows.

DETAILED DESCRIPTION OF THE DRAWINGS

Figure 1:
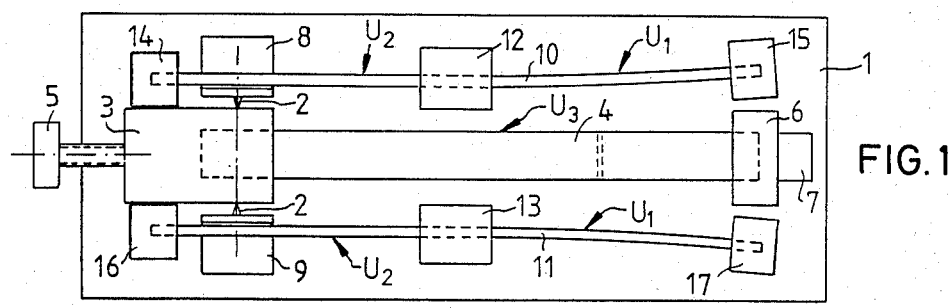
FIG. 1 is a top plan view of a first embodiment of the rotator according to the invention, conceived for rotation through about 15 degrees.
Figure 2:
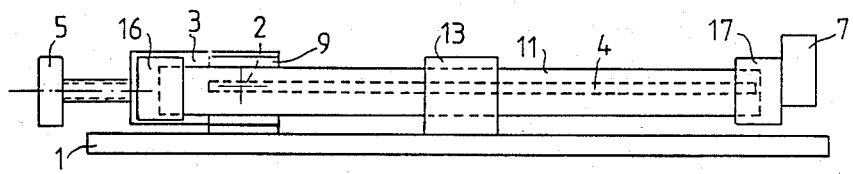
FIG. 2 is a side view of the rotator of FIG. 1.

FIG. 1 shows a first embodiment of the rotator mounted on a base plate 1. Pivotally mounted between gudgeons 2 is a block 3 which supports a piezoelectric rod, commonly called a bimorph, 4. The bimorph is a rod of piezoelectric material which translates a voltage which is applied to its electrodes into mechanical stress and therefor, movement. The steps of cutting and orienting the piezoelectric material, to form a bimorph which is capable upon actuation of extension in a desired mode, are well known in the art. Block 3 is equipped with an adjustable screw 5 which serves to counterbalance the masses of bimorph 4, of the clamping shoe 6 attached to the free end of bimorph 4, as well as of the "payload" 7 carried by clamping shoe 6. Payload 7 can, for example, be an object which has to be moved for inspection, or treatment, or a tool or electrode, such as the tip of a Scanning Tunneling Microscope. Gudgeons 2 are supported in angles 8 and 9 resting on base plate 1. FIG. 2 shows a side view of this arrangement.

Figure 3:
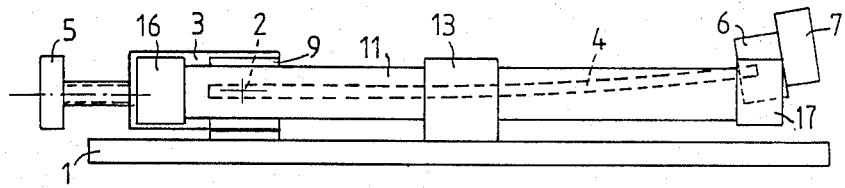
FIG. 3 is a side view of the rotator of FIG. 1 in an actuated position.

A pair of bimorphs 10 and 11 rests in supports 12 and 13, respectively, which are fixed on base plate 1. Bimorphs 10 and 11 extend along the length of bimorph 4 including the lengths of the clamping shoe 6 and block 3. Bimorphs 10 and 11 may also be realized by two shorter bimorphs each. Bimorphs 10 and 11 at their ends carry clamping members 14, 15 and 16, 17, respectively. With no potential applied to the electrodes of bimorphs 10 and 11, clamping members 14 and 16 will rest against block 3 and clamping members 15 and 17 will rest against clamping shoe 6. FIG. 1 shows the state where a potential has been applied to the electrodes associated with the ends of bimorphs 10 and 11 having clamping members 15 and 17 causing clamping members 15 and 17 to disengage clamping shoe 6. A potential is now applied to the electrode of bimorph 4 causing it to bend and (FIG. 3) raise payload 7 along a circular path above its home position.

Figure 4:
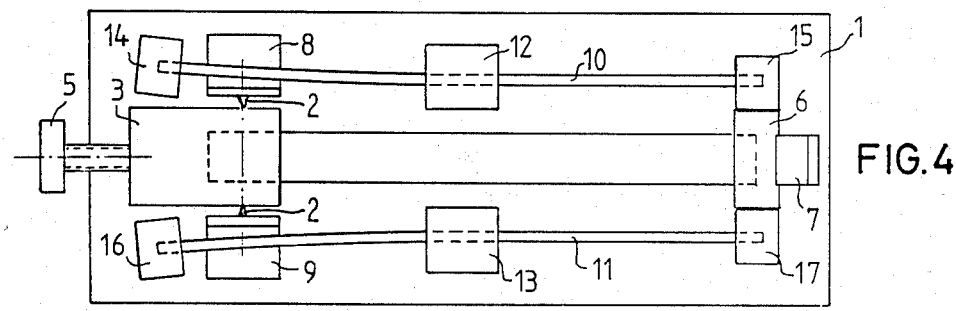
FIG. 4 is a top plan view of the rotator of FIG. 1 in another state of operation.
Figure 5:
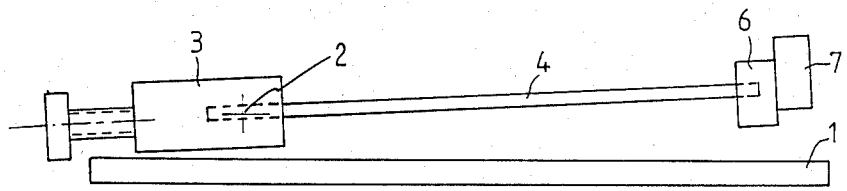
FIG. 5 is a schematic side view of the rotator of FIG. 3 after stretching.

After the potential has been removed from bimorphs 10 and 11, members 15 and 17 return to their normal position of clamping the now raised clamping shoe 6 of bimorph 4 (FIG. 4). Now the potential to bimorph 4 is switched off and a potential is applied to the part of bimorphs 10 and 11 associated with clamping members 14 and 16 causing them to disengage block 3. With the potential at bimorph 4 switched off, bimorph 4 stretches and assumes the position shown in FIG. 5, with block 3 pivoting about gudgeons 2.

It will be known to those skilled in the art that the amount of bending exercized by the various bimorphs strictly depends on the amplitude of the potential applied. It is, accordingly possible to lift payload 7 through fractions of a second of arc in one step of the procedure just described, which can, of course be repeated until the desired deflection has been reached. The bender can, of course, be caused to perform larger steps by applying greater amplitudes. A bender 25 mm long, for example, can move about 1 $\mu$m/V, corresponding to approximately 10 seconds of arc per volt, in the arrangement of FIGS. 1 through 5. Thus 1 mV yields a $10^{-2}$ seconds of arc displacement, while the maximum allowed voltage of about 200 V would result in an angular displacement of approximately one half of a degree (30'). The maximum total deflection for which the embodiment of FIGS. 1 through 5 is designed is about 15 degrees.

Figure 6:
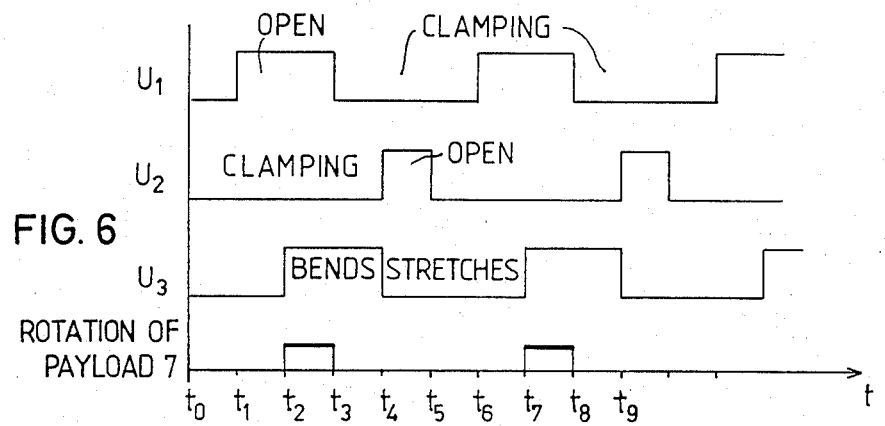
FIG. 6 is a timing diagram of the operation of the rotator of FIGS. 1 through 5.

FIG. 6 is a timing diagram illustrating in a schematic fashion the sequence of steps occurring during the operation of the embodiment of FIGS. 1 through 5. At time $t_0$, potential $U_1$ and $U_2$ at the electrodes of bimorphs 10 and 11 are zero so that block 3 and shoe 6 are being clamped. With $U_1$ applied at time $t_1$, clamping members 15 and 17 open, permitting bimorph 4 to bend when $U_3$ is applied at time $t_2$. Payload 7 thus performs a first rotary step between times $t_2$ and $t_3$. At $t_3$, $U_1$ is switched off so that payload 7 is arrested in its attained position. At time $t_4$, $U_2$ is applied freeing block 3 for rotation about gudgeons 2, and $U_3$ is switched off so that bimorph 4 stretches. At time $t_5$, $U_2$ switched off leaving block 3 clamped in its pivoted position. This completes the first step of rotation, and at time $t_6$ a new cycle can start leading to a second step of rotation between times $t_7$ and $t_8$.

Since the rotator is balanced by means of screw 5, payload 7 can be caused to return to its original position by reversing the potential $U_3$ at bimorph 4 and applying potentials $U_1$ and $U_2$ at bimorphs 10 and 11 in the opposite sequence.

Figure 7:
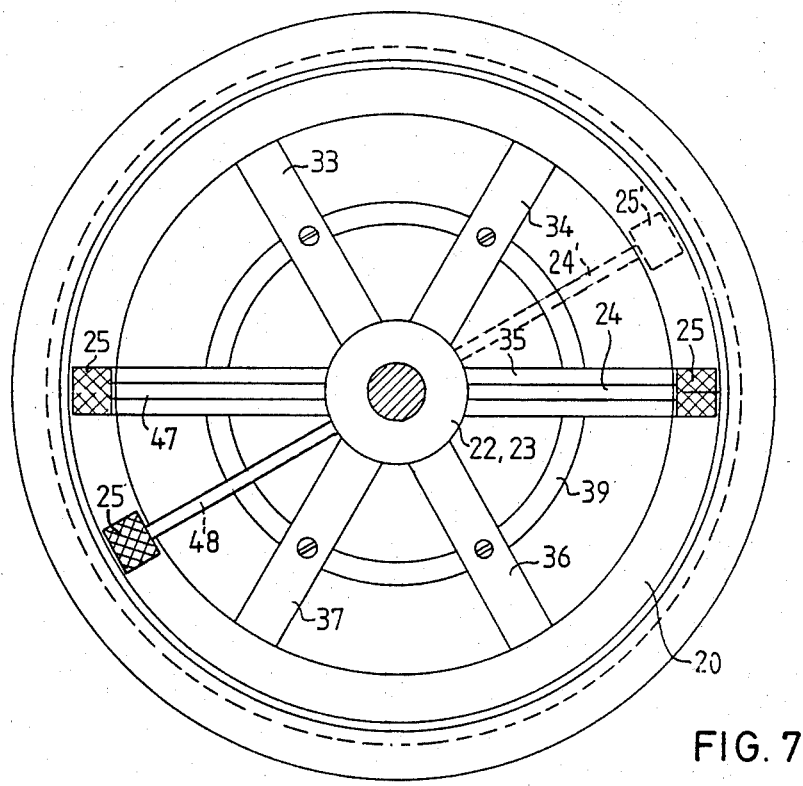
FIG. 7 is a top plan view of another embodiment of a rotator according to the invention, conceived for unlimited rotation.
Figure 8:
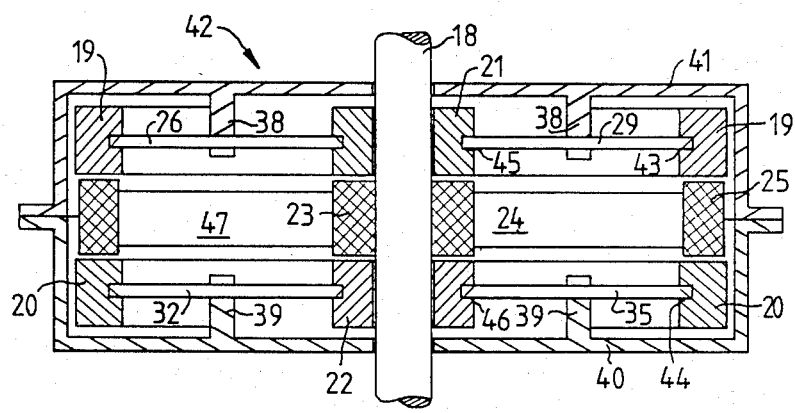
FIG. 8 is a cross section of the rotator of FIG. 7.

Another embodiment of the same invention is shown in FIGS. 7 and 8 which depict a piezoelectric rotator designed for unlimited rotation. This embodiment can be thought of as being derived from the one shown in FIGS. 1 through 5 which gudgeons 2 replaced by a shaft 18, and clamping members 14, 16, and 15, 17 replaced by two pairs of clamping rings 19, 20 and 21, 22.

Fixed to a hub 23, which is rigidly attached to shaft 18, is bimorph 24 the free end of which carries a clamping shoe 25. The rings 21 and 22 are radially disposed about shaft 18, each carrying a plurality of (for example as illustrated: six) spoke-like bimorphs 26 through 31 and 32 through 37, respectively. Bimorphs 26 through 31 extend between rings 19 and 21, whereas bimorphs 32 through 37 extend between rings 20 and 22. Each of the bimorphs 26–31 and 32–37 is mounted at its center to a circular rib 38, 39 forming an integral part with the lower and upper halves 40 and 41, respectively, of a housing 42. Ribs 38 and 39 are analogues to supports 12 and 13 of the embodiment shown in FIGS. 1 through 5. The electrodes of bimorphs 26–31 and 32–37 are split at the location of attachment to ribs 38 and 39 so that the two halves of each bimorph can be activated individually.

Control of the bimorphs in this and the other embodiments described below is performed by suitable electronic circuitry not a subject of this invention, and supply of the control potentials can be made via conventional sliding contact rings known in the art but not shown in the drawings.

By way of example, in the non-actuated state, rings 19 and 20 are held clear of shoe 25, while rings 21 and 22 clamp hub 23 between them. Application of a potential to the electrodes of bimorph 24 results in a bending of the latter which causes a slight circular displacement of shoe 25 to position 25'. A potential is now applied to all of the partitioned electrodes of bimorphs 26–31 and 32–37 causing rings 19 and 20 to clamp shoe 25 at 25' between rings 19 and 20 and rings 21 and 22 to release hub 23 from between rings 21 and 22. So far, no rotation of shaft 18 has occurred, but as the potential at bimorph 24 is switched off, and the end of the bimorph with clamping shoe 25 is held stationary at 25' by rings 19 and 20, the bimorph will stretch to a straight shape at 24', 25' thereby rotating shaft 18 through one "step" with respect to housing 42. The cycle may now be repeated.

In view of the fact that the bimorphs 26-31 and 32-37 slightly change their length and the alignment of their ends when bending, they may be loosely supported in grooves 43 through 46 machined into rings 19 through 22, as illustrated in FIG. 8, to avoid breaking. Of course, appropriate provision should be made to prevent mutual circular displacement between bimorphs and clamping rings.

The rotator of FIGS. 7 and 8 in operation generates a mutual rotary displacement between shaft 18 and housing 42. One skilled in the art will understand that the torque may be obtained at the shaft or at the housing.

Obviously, with a single bimorph 24 the rotator's generated torque is rather small. A greater torque may, however, be obtained through the use of two or more radial bimorphs as indicated by reference numbers 47, 48, all attached to hub 23, and all carrying a clamping shoe 25.

Figure 9:
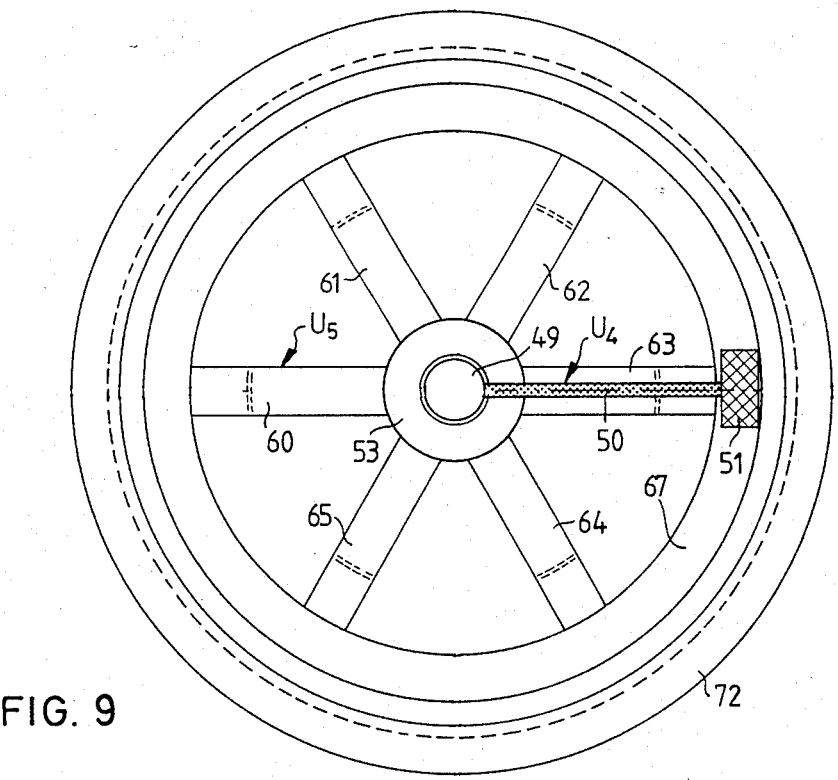
FIG. 9 is a simplified version of the embodiment of FIGS. 9 and 10.
Figure 10:
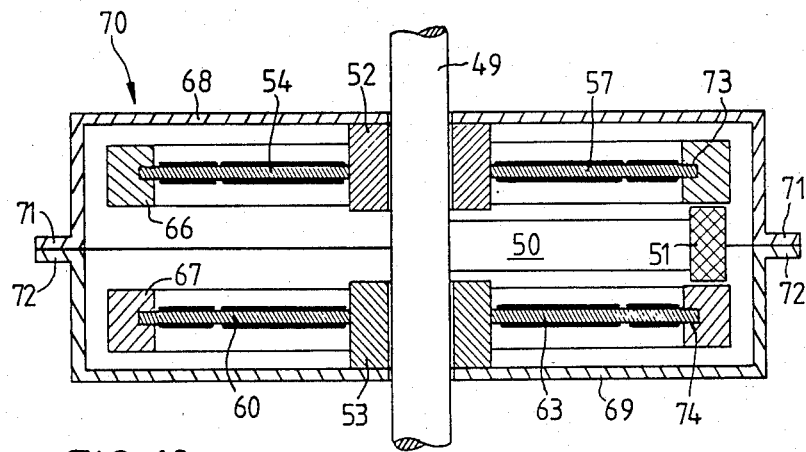
FIG. 10 is a cross section of the rotator of FIG. 9.

A similar but simplified embodiment of a rotator for unlimited rotation is shown in FIGS. 9 and 10.

Fixed to shaft 49 is bimorph 50 the free end of which carries a clamping shoe 51. Hubs 52 and 53 are radially disposed about shaft 49, each hub carrying a plurality (for example: six) spoke-like bimorphs 54 through 59 and 60 through 65, respectively. Bimorphs 54 through 59 are fixed to a ring 66 whereas bimorphs 60 through 65 are connected to a ring 67.

In operation, with no potentials applied, rings 66 and 67 clamp shoe 51 between them. Application of a potential to the electrodes of bimorph 50 results in a bending of the latter which causes a slight rotation of shaft 49. Assuming shaft 49 is now approximately arrested, energization of bimorphs 54-59 and 60-65 makes rings 66 and 67 clear shoe 51. De-energization of bimorph 50 lets it stretch again, and shoe 51 will now assume a position slightly advanced with respect to the home position. The cycle may now be repeated.

Hubs 52 and 53 are interconnected by means of two halves 68 and 69 of a casing 70 which are sealed to each other at their flanges 71, 72 (FIG. 8).

Again, as with the embodiment of FIGS. 7 and 8, grooves 73 and 74 are provided on the inside of rings 66 and 67 to allow bimorphs 54-59 and 60-65 to change their length and slightly deflect without breaking.

While FIGS. 9 and 10 show only a single piezoelectric bender or bimorph 50 for generating the torque for this positioner, obviously, a plurality of bimorphs with clamping shoes may be used in a concentric arrangement to increase the torque.

Figure 11:
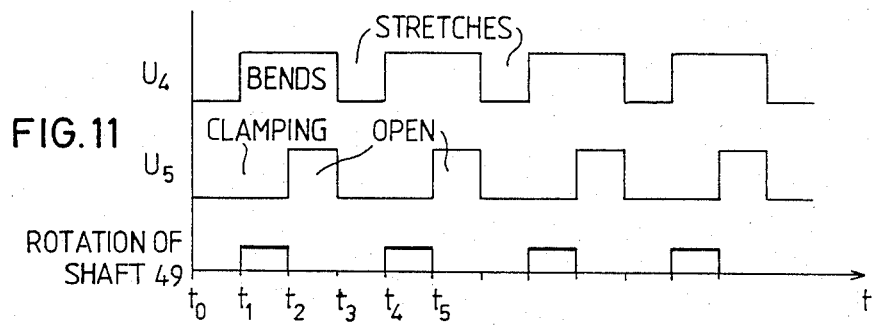
FIG. 11 is a timing diagram of the operation of the rotator of FIGS. 9 and 10.

The timing diagram of FIG. 11 shows that at time $t_0$ clampng shoe 51 is arrested by rings 66 and 67. At $t_1$, the potential $U_4$ applied to the electrodes of bimorph 50 causes the latter to bend and shaft 49 to rotate between $t_1$ and $t_2$. At time $t_2$, $U_5$ is applied to bimorphs 54 through 65 removing rings 66 and 67 from shoe 51. Now potentials $U_4$ and $U_5$ are switched off so that bimorph 50 is allowed to stretch and rings 66 and 67 to clamp. At this point the cycle might be started afresh.

Returning to FIG. 3, obviously clamping shoe 6 and payload 7 are slightly tilted as bimorph 4 is energized. This problem can be avoided by splitting the electrodes of bimorph 4 and energizing the such that part of bimorph 4 is bent upwardly, the other part downwardly, so that the ends of the bent bimorph stay parallel. It has been found that splitting the electrodes of bimorph 4 in a 7:3 relation will also take care of most of the length changes a bimorph undergoes when bending. The same relationship can be applied to bimorphs 26 through 37 and 54 through 65 of the embodiments of FIGS. 7 and 8, and FIGS. 9 and 10, respectively.

Figure 12:
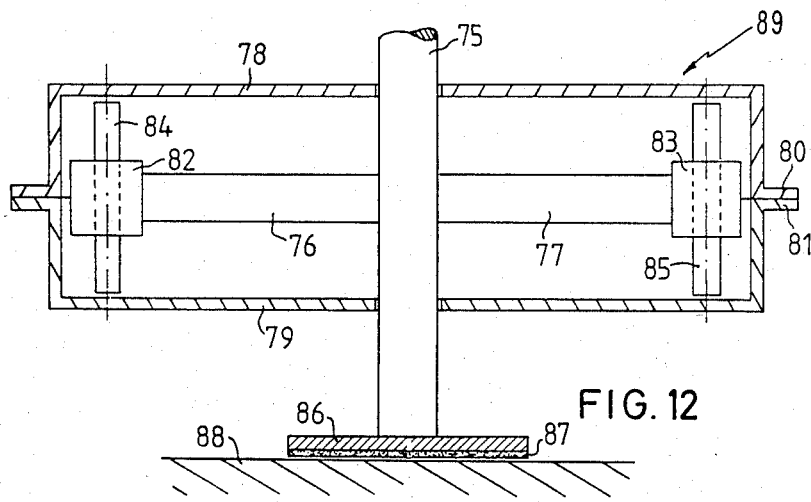
FIG. 12 is a cross section of still another embodiment of a rotator according to the invention, conceived for unlimited rotation.

FIG. 12 shows still another embodiment of the rotator in accordance with the invention in which the clamping of the bimorphs generating the rotation is done in a way different from that shown in FIGS. 8 and 10. In FIG. 12 the rotor consisting of a shaft 75 and bimorphs 76 and 77 is contained within housing halves 78 and 79 which may be screwed at their flanges 80 and 81. Bimorphs 76 and 77 carry blocks 82 and 83 at their free ends, the blocks being provided with piezoelectric rods or tubes 84 and 85, respectively. The length of rods 84, 85 is such that they normally rest with both ends against housing 78 and 79 thus arresting blocks 82 and 83 against displacement. Energization of rods 84, 85 causes their contraction and hence clearance from engagement with housing halves 78, 79. It will be easy for those skilled in the art to devise a suitable control system for appropriately energizing the bimorphs 76, 77 and the rods 84, 85 to obtain the rotation desired. It will also be obvious that this embodiment requires some locking mechanism at shaft 75 or at the housing to arrest the one of the other while bimorphs 76 and 77 are allowed to stretch.

The embodiments illustrated in FIGS. 10 and 12, having shaft 49 with housing 70 and shaft 75 with housing 89 respectively, require mutual locking while the bimorph stretches so as to prevent the rotation attained to be reversed upon de-energization of the bimorph. A very simple arrangement for arresting shaft 49 or 75 is shown in connection with the rotator of FIG. 12. Attached to one end of shaft 75 is a metal disk 86 which is coated with a dielectric layer 87. Disk 86 is maintained at a minute distance above a metal plate 88. Application of a potential between disk 86 and plate 88 causes an electrical field and, hence, electrostatic forces which attract and fix disk 86 against rotation. The effectiveness of this arrangement can be increased considerably, and the tolerances softened through choosing a very thin, flexible sheet metal for disk 86. It will pose no problem for those skilled in the art to control this locking mechanism in coordination with the actuation of the various piezoelectric elements involved.

Certainly, the embodiments of FIGS. 8, 10 and 12 can easily be made to rotate in both directions by just reversing the polarity of the potential applied to the rotating bimorphs and by appropriately reversing the said locking mechanism. Modifications by one having skill in the art, such as the positions of bimorphs and clamping means in the non-actuated states or the order of the engagement, energizing and disengagement steps may be made without departing form the spirit and scope of the invention herein described with reference to a preferred embodiment and hereinbelow claimed.

What is claimed is:

1. Apparatus for attaining discrete radial displacements with respect to a frame comprising;

a frame having a rotatable shaft through its center;

piezoelectric positioning means in said frame comprising at least one piezoelectric positioning rod having a first end affixed to said rotatable shaft and a second end having means adapted for being arrested;

at least one pair of piezoelectric arresting means, one of said pair being disposed on each side of said piezoelectric positioning means, a respective one of which comprises a first ring member fixedly mounted to said frame and radially disposed about said shaft, a second ring member for arresting said means for being arrested and at least one piezoelectric bar having a first end associated with said first ring member and a second end associated with said second ring member;

first electrode means for actuating said piezoelectric positioning means to achieve radial displacement of said positioning means and consequent rotation of said rotatable shaft with respect to said frame;

locking means controllable for engaging said rotatable shaft;

second electrode means for controlling said locking means; and third electrode means for actuating said piezoelectric arresting means, thereby to control said second ring members for arresting, whereby said second ring members are made to disengage said means adapted for being arrested to allow displacement, upon actuation by said first electrode means, of said second end of said positioning means while said locking means engages said rotatable shaft, and alternately are made to arrest said means adapted for being arrested while said locking means disengages said shaft allowing rotation of same.

2. Apparatus for attaining discrete radial displacements with respect to a frame having a rotatable shaft therethrough comprising;

a frame having a rotatable shaft through its center;

piezoelectric positioning means in said frame comprising a first hub affixed to said rotatable shaft and at least one piezoelectric rod having a first end fixedly mounted to said first hub and a second end having means adapted for being arrested;

at least one pair of piezoelectric arresting means, one of said pair being disposed on each side of said piezoelectric positioning means, a repective one of which comprises a first ring member radially disposed about said shaft and adapted for arresting said first hub, a second ring member for arresting said means adapted for being arrested and at least one piezoelectric bar having a first end associated with said first ring member and a second end associated with said second ring member;

first electrode means for actuating said piezoelectric positioning means to achieve radial displacement of said positioning means and consequent rotation of said rotatable shaft with respect to said frame; and second electrode means for actuating said piezoelectric arresting means whereby said first ring members for arresting said first hub are actuated independently of and asynchronously with said second ring members for arresting said means adapted for being arrested, such that said pair of first ring members is made to arrest said first hub of the piezoelectric positioning means and render said hub and associated shaft immobile while said second ring members are made to disengage said second end having means adapted for being arrested thereby allowing displacement upon actuation by said first electrode means of said second end of the piezoelectric positioning means and such that alternately said displaced second end is arrested by the second ring members while said first ring members disengage said first hub thereby allowing rotation of said hub and rotatable shaft to the displaced position of said non-clamped second end.

3. Apparatus for attaining discrete radial displacements with respect to a frame comprising:

a frame having a rotatable shaft through its center;

piezoelectric positioning means in said frame comprising at least one piezoelectric positioning member having first and second ends, and being affixed at said first end to said rotatable shaft;

piezoelectric arresting means for arresting said piezoelectric positioning means, said clamping means being associated with the second end of said piezoelectric positioning member;

locking means associated with said rotatable shaft for controllably engaging said rotatable shaft;

first electrode means for controlling said locking means;

second electrode means for actuating said piezoelectric positioning member to attain radial displacement of said member;

third electrode means for actuating said piezoelectric arresting means whereby said piezoelectric arresting means is made to alternately arrest and permit displacement of said positioning means.

4. Apparatus for attaining discrete radial displacements with respect to a frame having a rotatable shaft therethrough comprising, in combination:

a frame having a rotatable shaft through its center;

a piezoelectric positioning means in said frame comprising a first hub affixed to said rotatable shaft and at least one piezoelectric rod having a first end fixedly mounted to said first hub and a second end having means adapted for being arrested;

at least one pair of piezoelectric arresting means, one said pair being disposed on each side of said piezoelectric positioning means, a respective one of which comprises a first ring member radially disposed about said shaft and adapted for arresting said first hub, a second ring member for arresting said means adapted for being arrested and at least one piezoelectric bar having a first end associated with said first ring member and a second end associated with said second ring member, said piezoelectric bars associated with said piezoelectric arresting means comprises first and second independent piezoelectric arresting means and a common support therefor wherein the non-supported end of said first piezoelectric arresting member is associated with said first ring member, the non-supported end of said second piezoelectric arresting member is associated with said second ring member, and wherein said common support is affixed to said frame;

first electrode means for actuating said piezoelectric positioning means to achieve radial displacement of said positioning means and consequent rotation of said rotatable shaft with respect to said frame; and second electrode means for actuating said piezoelectric arresting means whereby said first ring members for arresting said first hub are actuated independently of and asynchronously with said second ring members for arresting said means for adapted for being arrested, such that said pair of first ring members is made to arrest said first hub of the piezoelectric positioning means and render said hub and associated shaft immobile while said second ring members are made to disengage said second end having means adapted for being arrested thereby allowing displacement upon actuation of said first electrode means of said second end of the piezoelectric positioning means and such that alternately said displaced second end is arrested by the second ring members while said first ring members disengage said first hub thereby allowing rotation of said hub and rotatable shaft to the displaced position of said non-clamped second end.

5. Apparatus, as in claim 4, wherein said second electrode means is split transversally at said common support thereby allowing said first and second piezoelectric arresting members to be alternately actuated.

* * * * *